US005838498A

United States Patent [19]
Hildebrand et al.

[11] Patent Number: 5,838,498
[45] Date of Patent: *Nov. 17, 1998

[54] MINIATURE SYNTHESIZED VIRTUAL IMAGE ELECTRONIC DISPLAY

[75] Inventors: Alfred P. Hildebrand, Palo Alto; Gregory J. Kintz, Mountain View, both of Calif.

[73] Assignee: Siliscape, Inc., Sunnyvale, Calif.

[ * ] Notice: The term of this patent shall not extend beyond the expiration date of Pat. No. 5,644,323.

[21] Appl. No.: 775,840

[22] Filed: Dec. 31, 1996

Related U.S. Application Data

[63] Continuation of Ser. No. 361,035, Dec. 21, 1994, Pat. No. 5,644,323.
[51] Int. Cl.$^6$ ................................................. G02B 27/14
[52] U.S. Cl. .......................................... 359/630; 359/631
[58] Field of Search .................................. 359/455, 626, 359/631, 632, 633, 793, 794, 630; 345/7, 8

[56] References Cited

U.S. PATENT DOCUMENTS

| | | | |
|---|---|---|---|
| 3,296,509 | 1/1967 | Katchman | 361/323 |
| 3,758,196 | 9/1973 | Weiss | 359/728 |
| 4,082,432 | 4/1978 | Kirschner | 359/631 |

(List continued on next page.)

FOREIGN PATENT DOCUMENTS

| | | |
|---|---|---|
| 0 351 967 | 1/1990 | European Pat. Off. . |
| 0 566 000 | 4/1993 | European Pat. Off. . |
| 0 566 002 | 4/1993 | European Pat. Off. . |
| 0 566 001 | 10/1993 | European Pat. Off. . |

OTHER PUBLICATIONS

Young, "Head–Mounted Display", IBM Technical Disclosure Bulletin, vol. 25, No. 12, pp. 6373–6374 (May 1983).

*Primary Examiner*—Georgia Epps
*Assistant Examiner*—Ricky Mack
*Attorney, Agent, or Firm*—Wilson Sonsini Goodrich & Rosati

[57] ABSTRACT

A synthesized virtual image electronic display is provided that includes a microdisplay for forming a source object which preferably has a surface area less than about 100 mm$^2$, a first stage magnification optic for magnifying the source object to produce a magnified real image, an image synthesizing optic upon which the magnified real image is projected, and a second stage magnification optic for providing a magnified virtual image of the magnified real image projected on the synthesizing optic. The image synthesizing optic provides the synthesized display of the present invention with significant optical and ergonomic advantages over that which can be achieved using prior art simple magnification and compound magnification systems.

Also provided is an electronic device which includes the synthesized display. The synthesized display is intended as an inexpensive component which may be incorporated into any electronic device in which an electronic display is needed.

The two stages of magnification optics and intermediate image synthesizing optic used in the synthesized display provide the significant advantage of enabling the synthesized display to be positioned within a small volume. It is preferred that the synthesized display be positioned within a volume of less than about 375 cubic centimeters, more preferably within a volume of less than about 94 cubic centimeters.

It is preferred that the first and second stage magnification optics provide a combined magnification of at least about 20, more preferably at least about 40. It is also preferred that the first stage magnification optic provide a magnification of between about 3 and 10 and a focal length of between about 3.5 and 37.5 mm. It is also preferred that the second stage magnification optic provide a magnification of between about 4 and 7 and an eye relief equal to or greater than about 15 mm, more preferably equal to or than about 35 mm, most preferably equal to or greater than about 50 mm.

44 Claims, 10 Drawing Sheets

U.S. PATENT DOCUMENTS

| | | | |
|---|---|---|---|
| 4,082,440 | 4/1978 | Bennett | 353/26 R |
| 4,099,831 | 7/1978 | Freeman | 359/369 |
| 4,339,188 | 7/1982 | Smith | 396/382 |
| 4,361,384 | 11/1982 | Bosserman | 359/630 |
| 4,717,248 | 1/1988 | La Russa | 359/857 |
| 4,728,185 | 3/1988 | Thomas | 353/122 |
| 4,832,427 | 5/1989 | Nanba et al. | 359/15 |
| 4,859,031 | 8/1989 | Berman et al. | 350/174 |
| 4,900,133 | 2/1990 | Berman et al. | 350/346 |
| 4,925,272 | 5/1990 | Ohshima et al. | 359/630 |
| 4,969,730 | 11/1990 | van den Brandt | 353/31 |
| 4,999,012 | 3/1991 | Suzuki et al. | 353/14 |
| 5,035,474 | 7/1991 | Moss et al. | 359/13 |
| 5,050,966 | 9/1991 | Berman et al. | 359/38 |
| 5,087,116 | 2/1992 | Taylor et al. | 359/851 |
| 5,121,099 | 6/1992 | Hegg et al. | 340/461 |
| 5,157,503 | 10/1992 | Dugdale | 358/238 |
| 5,189,512 | 2/1993 | Cameron et al. | 348/838 |
| 5,224,198 | 6/1993 | Jachimowicz et al. | 359/133 |
| 5,291,338 | 3/1994 | Bezard et al. | 358/859 |
| 5,303,085 | 4/1994 | Rallison | 359/631 |
| 5,305,124 | 4/1994 | Chern et al. | 359/13 |
| 5,323,477 | 6/1994 | Lebby et al. | 385/129 |
| 5,334,991 | 8/1994 | Wells et al. | 345/8 |
| 5,351,151 | 9/1994 | Levy | 359/240 |
| 5,357,372 | 10/1994 | Chen et al. | 359/13 |
| 5,361,165 | 11/1994 | Stringfellow et al. | 359/631 |
| 5,369,415 | 11/1994 | Richard et al. | 345/6 |
| 5,383,053 | 1/1995 | Hegg et al. | 359/486 |
| 5,386,216 | 1/1995 | Iino | 345/7 |
| 5,394,203 | 2/1995 | Murphy et al. | 353/13 |
| 5,418,584 | 5/1995 | Larson | 353/122 |
| 5,422,653 | 6/1995 | Maguire, Jr. | 345/9 |
| 5,422,758 | 6/1995 | Lawson | 359/634 |
| 5,426,521 | 6/1995 | Chen et al. | 359/9 |
| 5,451,976 | 9/1995 | Ito | 345/8 |
| 5,457,575 | 10/1995 | Groves et al. | 359/631 |
| 5,467,104 | 11/1995 | Furness, III et al. | 345/8 |
| 5,467,215 | 11/1995 | Lebby et al. | 359/247 |
| 5,477,385 | 12/1995 | Freeman | 359/629 |
| 5,479,224 | 12/1995 | Yasugak et al. | 353/101 |
| 5,483,307 | 1/1996 | Anderson | 353/98 |
| 5,485,318 | 1/1996 | Lebby et al. | 359/811 |
| 5,486,946 | 1/1996 | Jachimowicz et al. | 359/263 |
| 5,491,491 | 2/1996 | Lebby et al. | 345/7 |
| 5,499,138 | 3/1996 | Iba | 359/569 |
| 5,506,595 | 4/1996 | Fukano et al. | 345/7 |
| 5,506,728 | 4/1996 | Edwards | 359/629 |
| 5,519,536 | 5/1996 | Hoehn | 359/630 |
| 5,526,191 | 6/1996 | Nishii et al. | 359/757 |
| 5,530,586 | 6/1996 | Yasugaki | 359/364 |
| 5,537,260 | 7/1996 | Williamson | 359/727 |
| 5,539,422 | 7/1996 | Heacock et al. | 345/8 |
| 5,539,554 | 7/1996 | Lebby et al. | 359/83 |
| 5,539,578 | 7/1996 | Togino et al. | 359/630 |
| 5,543,958 | 8/1996 | Lebby et al. | 359/254 |
| 5,546,227 | 8/1996 | Yasugaki et al. | 359/630 |
| 5,552,934 | 9/1996 | Prince | 359/629 |
| 5,552,943 | 9/1996 | Hirano et al. | 360/72.3 |
| 5,557,353 | 9/1996 | Stahl | 353/69 |
| 5,572,363 | 11/1996 | Fergason | 359/630 |
| 5,579,026 | 11/1996 | Tabata | 348/8 |
| 5,579,161 | 11/1996 | Sekiguchi | 359/559 |
| 5,587,836 | 12/1996 | Takahash et al. | 359/630 |
| 5,596,433 | 1/1997 | Konuma | 359/631 |
| 5,596,451 | 1/1997 | Handschy et al. | 359/633 |
| 5,612,549 | 3/1997 | Nelson et al. | 257/88 |
| 5,619,377 | 4/1997 | Rallison | 359/631 |
| 5,627,678 | 5/1997 | Nishii et al. | 359/561 |
| 5,638,218 | 6/1997 | Oomura | 359/639 |
| 5,654,827 | 8/1997 | Reichert | 359/631 |
| 5,659,430 | 8/1997 | Togino | 359/630 |
| 5,661,604 | 8/1997 | Kuba | 359/637 |
| 5,687,020 | 11/1997 | Park et al. | 359/309 |
| 5,771,124 | 6/1998 | Kintz et al. | 359/633 |

FOREIGN PATENT DOCUMENTS

| | | |
|---|---|---|
| 2 004 383 | 8/1978 | United Kingdom . |
| 2 182 456 | 9/1983 | United Kingdom . |

MINIATURE SYNTHESIZED VIRTUAL IMAGE ELECTRONIC DISPLAY

This application is a continuation of application Ser. No. 08/361,035, filed Dec. 21, 1994, now U.S. Pat. No. 5,644,323.

BACKGROUND OF THE INVENTION

1. Field of the Invention

The invention generally relates to a miniature electronic display. More specifically the invention relates to a miniature electronic display which provides a magnified and synthesized virtual image from a microdisplay using two stages of magnification optics and an intermediate image synthesizing optic.

2. Description of Related Art

A continuing objective in the field of electronics is the miniaturization of electronic devices. Most electronic devices include an electronic display. As a result, the miniaturization of electronic displays is critical to the production of a wide variety of miniaturized electronic devices.

The purpose of an electronic display is to provide the human eye with a visual image of certain information. This visual image may be provided as either a real image or a virtual image. A real image refers to an image which is observed directly by the unaided human eye. A photograph is an example of a real image. Electronic displays which provide a real image generally provide some form of display surface on which the real image is formed and viewed. Examples of electronic displays which provide real images include liquid crystal displays, CRT monitors, and projection screens.

Figure 1:
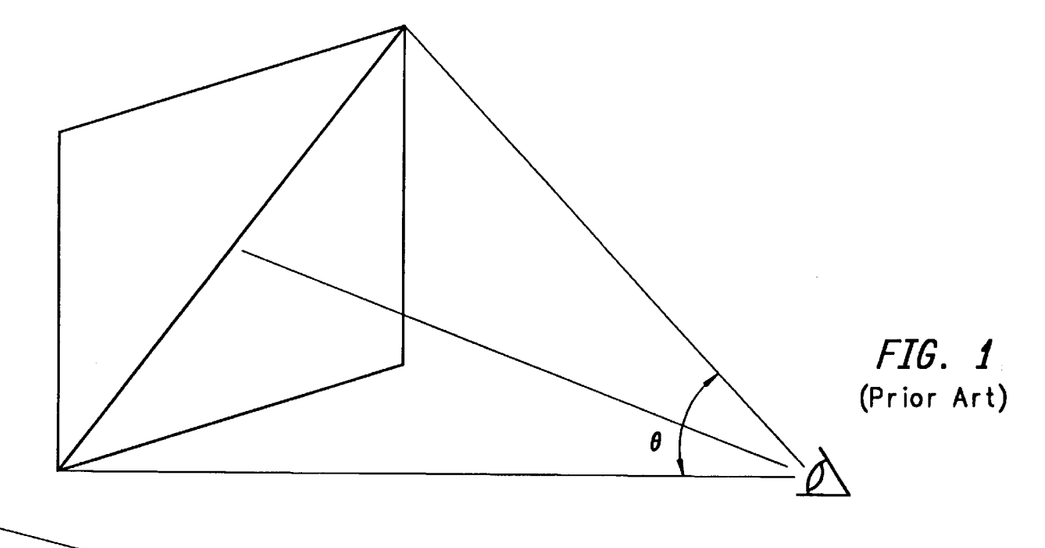
FIG. 1 illustrates the field of view of a prior art real image electronic display.

A real image electronic display is shown in FIG. 1. In real image electronic displays, the image viewed by the user is an image created on or projected onto a display surface. As a result, the size of the display surface limits the size of the image that can be provided to the user. Miniaturized electronic devices, because of their compact size, have limited space for a display surface and therefore are only able to accommodate a relatively small display image.

A relatively small display image creates a series of problems for the person viewing the image. The human eye is only able to resolve a limited amount of detail in an image. Two objects can be resolved by the eye as separate objects only when they are separated by a certain minimum angle as measured from the eye. The unaided human eye can resolve objects with an angle of separation of approximately 1–2 arc minutes or more.

The human eye also has difficulty focusing on source objects at very short distances from the eye without causing eye strain. The near point for the unaided human eye is defined as the closest distance that the eye can focus on an object without causing eye strain. The near point for the unaided human eye is about 25 cm for an average middle aged adult. The near point is much longer for an older adult and can be as long as 100 cm.

The display surface of a real image electronic display is comprised of an array of small objects, called pixels, which form a real image on the display surface. For the reasons described above, the resolution of the unaided human eye and the near point of the eye determine the minimum pixel size that the unaided human eye can resolve. Thus, for an electronic display located at the near point for an average middle aged adult, the minimum separation between pixels that can be resolved by the unaided eye is about $75 \times 10^{-4}$ cm, or 75 microns. In order to accommodate for variations in the human eye, the minimum separation between the pixels is preferably larger than the minimum resolvable pixel size.

For small real image electronic displays, if useful amounts of information are assembled from pixels of this size, the display must be viewed at a distance close to the near point, and, as a result, the user must focus his or her eyes on the small display. The need to focus on a small electronic display each time the electronic display is used creates discomfort and eventually, unwanted eye strain on the user. The problem of eye strain becomes particularly acute when the user is only intermittently focusing on the electronic display. It therefore is desirable to employ an electronic display which minimizes the user's need to refocus his or her eyes in order to view the electronic display.

Another important property of the human eye which determines the utility of an electronic display is the eye's angular field of view of an image. The eye can see over a field of view of up to 100 degrees. However, beyond 10–15 degrees from the center of the field, the resolution degrades significantly. A comfortable field of view for normal electronic display surfaces is typically in the range of 20–40 degrees. For real image displays, the field of view is defined as the ratio between the largest dimension of the display surface and the distance from the eye to the display. An example of a display surface with such a field of view would be a TV screen with a 100 cm diagonal viewed at 150 cm. The human eye compensates for the lower resolution at the edges of the display surface by scanning the eye across the display. The scanning of the eye is called eye roll. The eye roll moves the pupil of the eye. The typical distance for the motion of the pupil of an adult is about 1 cm.

An optical system can produce both real and virtual images. Several examples of electronic displays providing real images were discussed above. A real image exists at a given location when, if a viewing surface is positioned at this location, a real image can be observed by the unaided eye. Conversely, a virtual image is an image which, if a viewing surface were positioned at the location of the virtual image, no image would be observed by the eye. An example of a virtual image is the image of fine print viewed through a magnifying glass. The print not only appears larger, it also appears to be located substantially behind the surface where the print actually exists. By definition, a virtual image can exist at a location where no display surface exists. The size of the virtual image therefore is not limited by the size of a display surface. Virtual image electronic displays thus have the advantage of eliminating the need for a large display surface in order to produce a large electronic image.

A virtual image electronic display must initially form a source object which is then imaged by an optical system to create the virtual image. A substantial advantage of a virtual image electronic display is that the source object initially created may be as small as can be usefully reimaged by the optical system. As a result, virtual image electronic displays may effectively utilize very small microdisplays to form the source object. Pixel sizes may be as small as a few microns in diameter, a size which the unaided eye cannot resolve. Rather, in order to view the source object formed by the microdisplay, substantial magnification of the optical system is required.

A virtual image must be created by an optical system of some kind. In a real image electronic display, it is the eye and the viewing surface properties which determine the viewing parameters. By contrast, in a virtual image display, the optical system determines most of the viewing parameters. When viewing a virtual image through an optical system, there are three important parameters relating to the ease of viewing the image. The first parameter is the range of distances from the eye which the optical system can be held and have the eye still see the entire virtual image. The second parameter is the apparent angular width of the virtual image which is commonly referred to as the field of view of the virtual image. The field of view is defined as the ratio of the apparent width of the virtual image to the apparent distance to the virtual image and is equivalent to the field of view for a real image display surface. The third parameter is the transverse distance that the eye may move with respect to the optical system and still have the eye see the entire virtual image through the optical system.

Figure 2:
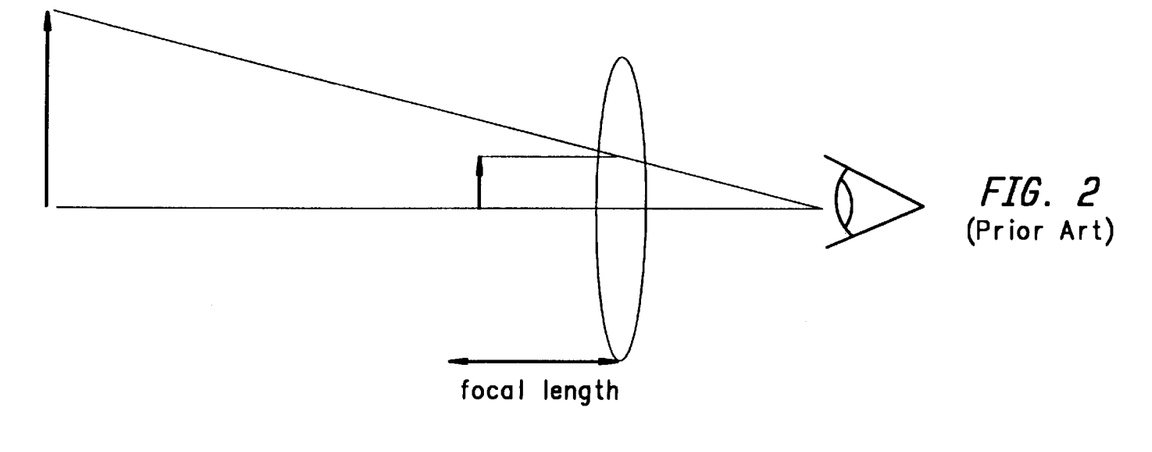
FIG. 2 illustrates a prior art simple magnifying lens optical system.

A simple magnifying lens is shown in FIG. 2. The function of a magnifying lens is to provide an image of a nearby object that is larger that the image seen by the unaided eye. The object is placed a distance from the simple lens that is less than the focal length of the lens. The eye observes a virtual image through the magnifying lens which is larger than the object itself. A simple magnifying lens can magnify a real display surface to produce a virtual image that is significantly larger that the real display. In addition, if the object is placed at the focal point for the magnifying lens, the apparent location of the image is very far away. As a result, the eye is able to view the virtual image in a very relaxed state, thereby minimizing the creation of eye strain on the user.

Figure 3:
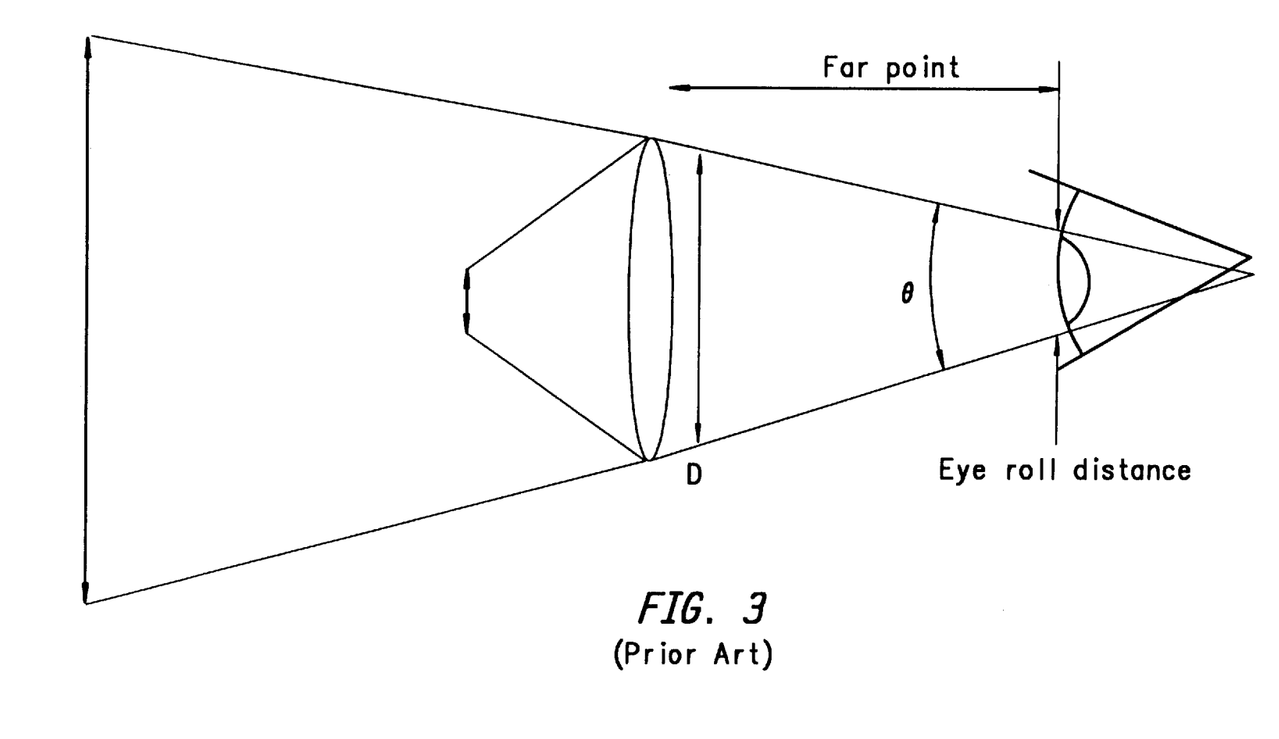
FIG. 3 illustrates how the far point of a prior art simple magnifying lens optical system is related to the field of view of a virtual image, eye roll, and the diameter of the optic.

The far point of a lens refers to the longest distance that the eye can be held from a magnifying lens and still see the entire virtual image. As illustrated in FIG. 3, the far point is related to the field of view of the virtual image, the eye roll, and the diameter of the optic. The far point increases as the diameter of the optic increases. Optical devices which provide a far point which is a short distance from the optic are undesirable due to the inconvenience and discomfort associated with placing the eye in close proximity with the optic. It is therefore preferred that an optic provide a long far point in order to enable the magnified image to be viewed through the optic at a comfortable and convenient range of distances from the optic.

For a simple magnifying lens, the maximum diameter that the optic can have is related to the magnification of the optic. In order to increase the magnification of an optic, the focal length of the optic must be decreased. According to simple lens physics, the maximum diameter that a simple optic can have is approximately equal to the focal length of the optic. Thus, in order to increase the magnification of an optic, the focal length of the optic must be reduced. This reduces the maximum diameter that the optic can have which, in turn, reduces the maximum eye relief provided by the optic. In addition, as the magnification of a simple lens is increased and the diameter of the optic is reduced, the amount of translational movement that the eye can have relative to the magnifying lens while still being able to see the image is reduced. Combined, these factors serve to limit the degree of magnification that a simple magnifying lens can provide.

For example, users with eye glasses generally require an eye relief of at least 25 mm. It is thus preferred that an electronic display provide an eye relief of at least about 25 mm. A simple 10×magnifying lens generally has a focal length of about 25 mm. The eye relief provided by a 10×magnifier viewing a virtual image with 40 degree field of view is about 25 mm. Since eye relief decreases as the magnification of an optic increases, magnifying lenses that provide greater than 10×magnification are not useful for providing eye relief of at least about 25 mm.

Figure 4:
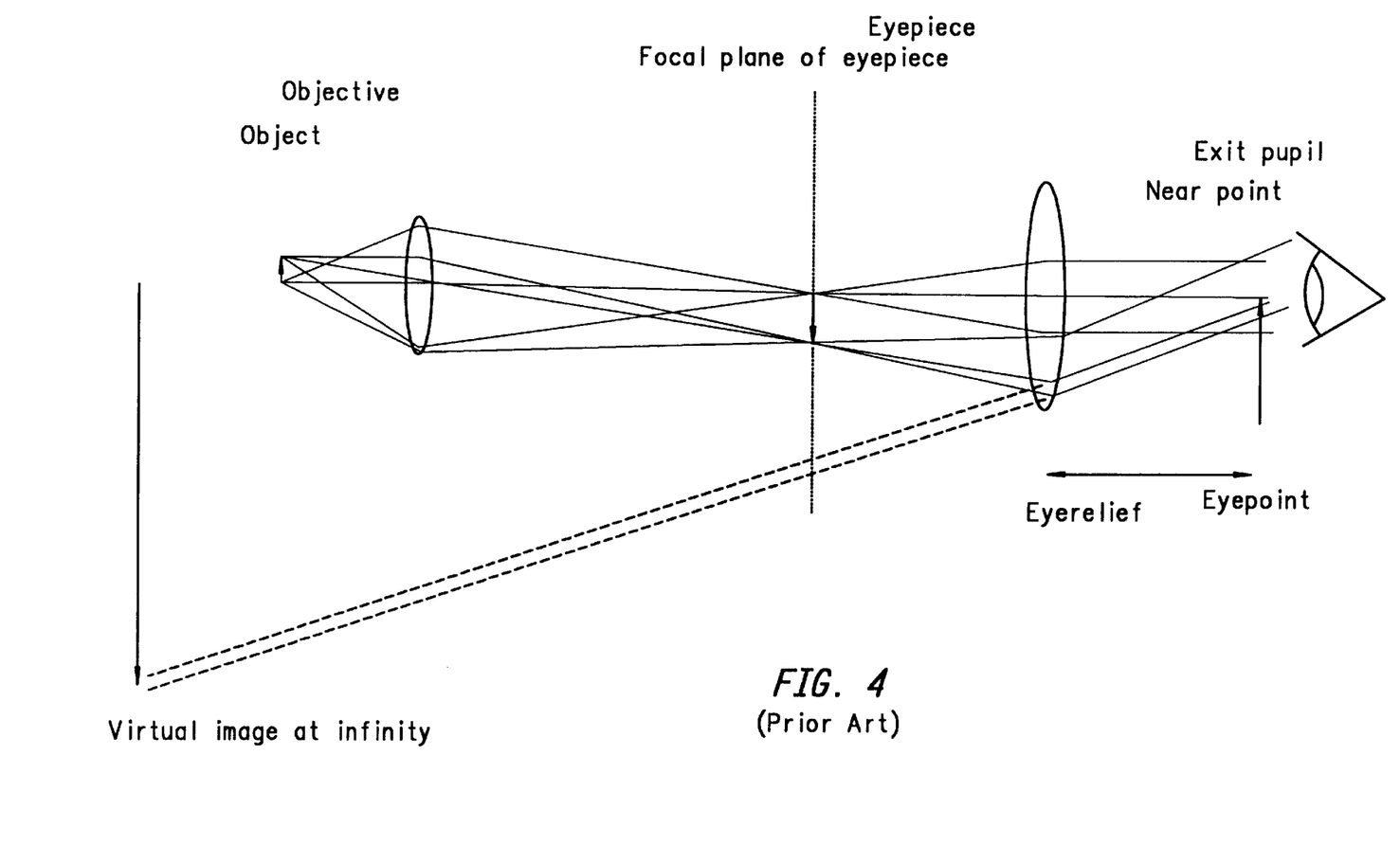
FIG. 4 illustrates a prior art compound microscope.

A compound microscope is depicted in FIG. 4. The simplest compound microscope is an optical system with two magnifying optics. The lens closest to the eye is referred to as the eyepiece. The lens closest to the source object is called the objective. The objective forms a real inverted, and usually magnified image of the object. This real image resides in space on the focal plane of the eyepiece. The eyepiece magnifies this real image even further. Compound microscopes have the advantage of providing a higher magnification of nearby objects than can be achieved using a simple magnifying lens.

Compound microscope optical systems have several disadvantages that arise from the path of the light rays through the optical system. The exit pupil of the compound microscope is defined as the transverse distance across the eyepiece where the entire image of the source object is still visible. When the pupil of the eye is outside the exit pupil, light rays from some part of the object are blocked by the optical system and the virtual image is vignetted. The light rays from the edge of the object must also intersect the pupil of the eye. If the eye is too close to the eyepiece, the edge of the object no longer appears illuminated since the light rays from the edge of the object are blocked by the optical system and the virtual image is vignetted. If the eye is too far away from the eye piece, again the light rays from the edge of the object are blocked and virtual image is vignetted. The point where the entire virtual image is visible in the compound microscope is called the eyepoint. The distance from the eyepoint to the eyepiece is commonly referred to as the eye relief and is equivalent to the far point of a simple magnifying lens. The volume of space around the eyepoint where the image is still visible is restricted by the optical system, and as a result, the functional volume of space within which the user's eye can be placed is greatly limited in a compound microscope. Given the limited functional volume provided by a compound magnification system, it is generally necessary to move the compound microscope to compensate for the user's eye movements. This greatly limits the functional utility of the compound microscope in viewing systems for electronic displays.

In view of the deficiencies associated with electronic displays using simple and compound magnification systems, a need currently exists for an inexpensive, miniature virtual image electronic display that is positionable within a small volume, that provides the user with a large field of view, a virtual image with a significant degree of eye relief and a large translational distance.

SUMMARY OF THE INVENTION

A synthesized virtual image electronic display is provided that includes a microdisplay for forming a source object which preferably has a surface area less than about 100 $mm^2$, a first stage magnification optic for magnifying the source object to produce a magnified real image, an image synthesizing optic upon which the magnified real image is projected, and a second stage magnification optic for providing a magnified virtual image of the magnified real image projected on the synthesizing optic. The image synthesizing optic provides the synthesized display of the present invention with significant optical and ergonomic advantages over that which can be achieved using prior art simple magnification and compound magnification systems.

Also provided is an electronic device which includes the synthesized display. The synthesized display is intended as an inexpensive component which may be incorporated into any electronic device in which an electronic display is needed.

The two stages of magnification optics and intermediate image synthesizing optic used in the synthesized display provide the significant advantage of enabling the synthesized display to be positioned within a small volume. It is preferred that the synthesized display be positioned within a volume of less than about 375 cubic centimeters, more preferably within a volume of less than about 94 cubic centimeters.

It is preferred that the first and second stage magnification optics provide a combined magnification of at least about 20, more preferably at least about 40. It is also preferred that the first stage magnification optic provide a magnification of between about 3 and 10 and a focal length of between about 3.5 and 37.5 mm. It is also preferred that the second stage magnification optic provide a magnification of between about 4 and 7 and an eye relief equal to or greater than about 15 mm, more preferably equal to or greater than about 35 mm, most preferably equal to or greater than about 50 mm.

BRIEF DESCRIPTION OF THE DRAWINGS

FIG. 9 illustrates two alternate types of apertures that may be used in the synthesized display of the present invention in which

FIG. 10 illustrates the incorporation of a synthesized display into an electronic device in which FIG. 10l illustrates a cross-sectional view of the device and FIG. 10b illustrates a top view of the device.

DESCRIPTION OF THE PREFERRED EMBODIMENTS

The present invention relates to an inexpensive synthesized virtual image electronic display which provides a magnified virtual image of a source object formed by a microdisplay using two stages of magnification optics and an intermediate image synthesizing optic. In order to employ a microdisplay in an electronic display, the source object formed by the microdisplay must be sufficiently magnified to enable a user's eye to resolve the magnified image. The synthesized virtual image electronic display of the present invention, hereinafter referred to as the synthesized display magnifies the source object formed by a microdisplay using a compound magnification system which is comprised of two stages of magnification optics. A first stage magnification optic provides a real image of the source object formed by the microdisplay which is magnified and located in the focal plane of the second stage magnification optic. The second stage magnification optic then provides a further magnified virtual image to be viewed by the eye of the user.

Unlike conventional prior art compound magnification systems, the synthesized display also employs an image synthesizing optic positioned between the first and second stage magnification optics in the focal plane of the second stage magnification optics. The synthesizing optic provides a synthesis function of the real image from the first stage magnification optics. Because the real image produced by the first magnification optic is located on the image synthesizing optic, an image of each pixel is located on that optic, each pixel being represented in that image as either the presence or absence of light from the object as magnified by the first magnification optics. The light from each pixel represents the real image of that pixel and has a well defined cone angle and a well defined central ray of that cone, such cone angle and central ray being determined by the corresponding object pixel location and by the first stage magnification optics. The image synthesizing optic serves to alter the direction of the central ray and alter the cone angle and the shape of the cone to provide enhanced properties to the virtual image provided by the second stage magnification optics.

By using two stages of magnification optics and an intermediate image synthesizing optic, the size of the components and spacing between the components employed in the synthesized display of the present invention is reduced such that the display can be positioned within a small volume. The synthesized display is preferably positionable within a volume of less than about 375 cubic centimeters, most preferably less than about 94 cubic centimeters. These volumes respectively correspond to the volume created by a 100 mm and 25 mm thick electronic device employing an approximately 50×75 mm PCMCIA card.

The use of two stages of magnification optics in combination with an intermediate image synthesizing optic provides the synthesized display with enhanced eye relief and a wider field of view than is possible using a traditional compound microscope system. For example, the synthesized display enables the user to view the display over a 30 degree full angle field of view with at least about a 25 mm eye relief.

The synthesized display of the present invention is intended as an inexpensive electronic component which may be incorporated into any electronic device in which an electronic display is used. In particular, the synthesized display is designed for pocket-sized electronic devices. Examples of such devices include, but are not limited to, portable computers, personal communicators, personal digital assistants, modems, pagers, video and camera viewfinders, mobile phones, television monitors and other hand held devices.

The synthesized display preferably provides a magnified virtual image of a source object that has been magnified by a factor of at least about 20, most preferably by a factor of at least about 40. The source object preferably has a surface area equal to or less than about 100 mm$^2$, most preferably equal to or less than about 25 mm². It should be noted, however, that the present invention can be readily applied to magnifications less than 20 and to microdisplays that form source objects larger than 100 mm².

The synthesized display preferably provides an eye relief equal to or greater than about 15 mm, more preferably equal to or greater than about 35 mm, most preferably equal to or greater than about 50 mm. The synthesized display also preferably provides an image which is at least equivalent in size to a computer monitor (24 cm×18 cm) when viewed at 50 cm. This size is roughly equivalent to a large screen TV (100 cm diagonal) when viewed at 165 cm.

Figure 5:
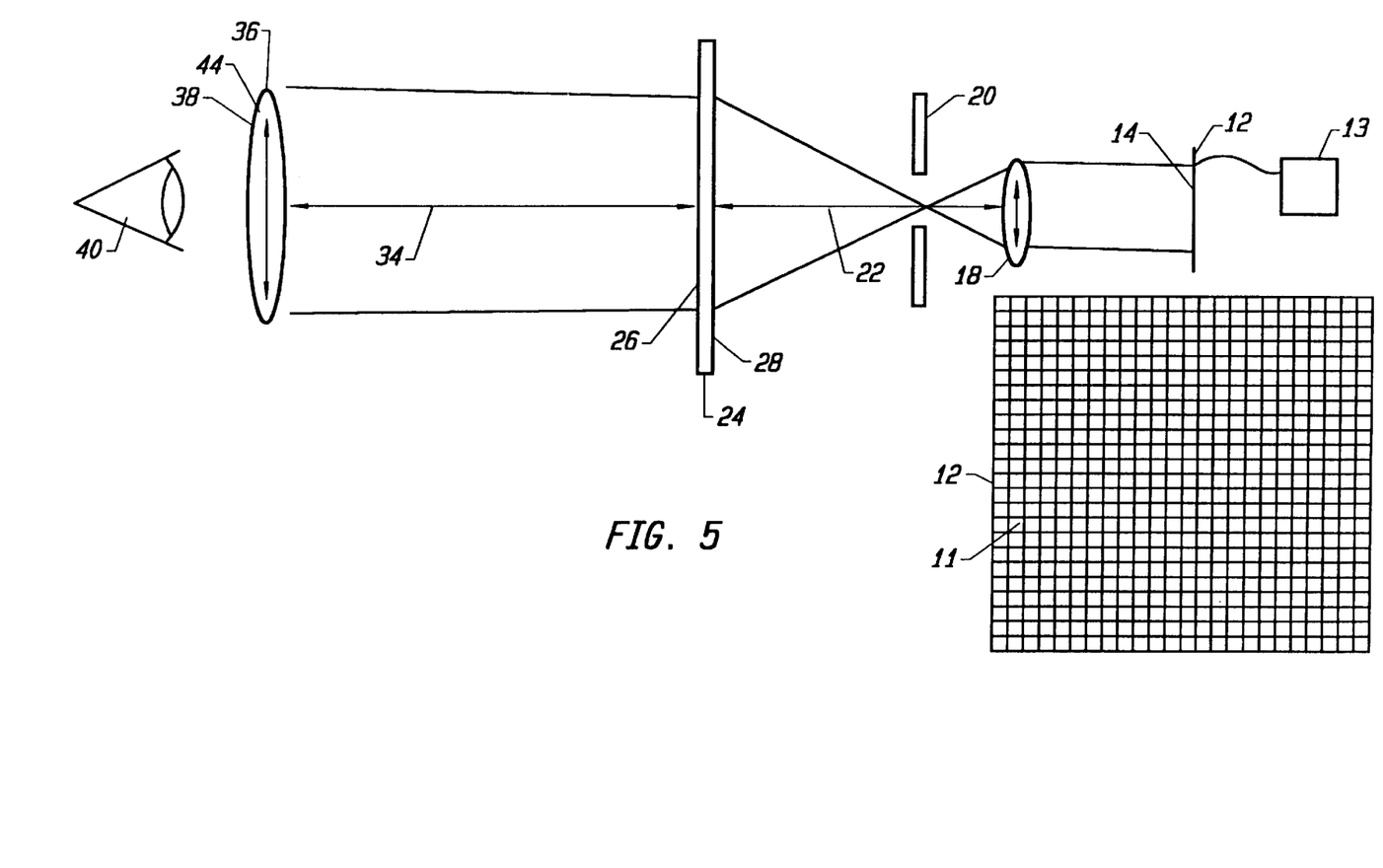
FIG. 5 illustrates an embodiment of the synthesized display of the present invention in which a transmissive image synthesizing optic is employed.

An embodiment of the synthesized display is illustrated in FIG. 5. As illustrated in FIG. 5, the synthesized display includes a microdisplay 12 which forms a source object 14. The microdisplay may be any electronically activated display which produces an image of any type. For example, the microdisplay may be a liquid crystal display, a CRT, a spatial light modulator, a grating, a mirror light valve or a LED array.

The microdisplay is frequently the most expensive component of the synthesized display. It is therefore preferred that the size of the microdisplay be minimized. The microdisplay preferably has a surface area equal to or less than about 100 mm², most preferably equal to or less than about 25 mm². However, it should be understood that larger microdisplays may be employed in the present invention. It is also preferred that the microdisplay 12 form a source object 14 using an array of pixels 11 on the microdisplay 12 wherein each pixel has an area equal to or less than about 400 square microns, more preferably 100 square microns.

In a preferred embodiment, the microdisplay used to form the source object is a spatial light modulator. Spatial light modulators, also known as light valves, are well known in the art for use in electronic display systems. In general, a spatial light modulator includes an addressable array of light modulating mirror elements which modulate incident light in a spatial pattern to produce an image. The array of modulating elements are modulated in response to an electrical or optical input where each light modulating element corresponds to a pixel of the image generated by the light modulator. Incident light may be modulated by the modulating elements with regard to phase, intensity, polarization, or direction. Light modulation may be achieved using a variety of materials exhibiting electrooptic or magnetooptic effects and by materials that modulate light by surface deformation. Electrical control of the addressable mirror elements forming the spatial modulator is described in U.S. Pat. No. 4,441,791 issued to Hornbeck which is incorporated herein by reference. In the present invention, a spatial light modulator is used to form a source object which is then magnified in two magnification stages. Examples of spatial light modulators that may be used in the synthesized display of the present invention and their principle of operation are described in U.S. Pat. Nos. 4,638,309, 4,680,579 issued to Ott, U.S. Pat. No. 5,287,215 issued to Warde, U.S. Pat. Nos. 4,441,791, 4,710,732, 4,596,992, 4,615,595, 4,662,746 and 5,061,049, 5,280,277 issued to Hornbeck, U.S. Pat. Nos. 5,287,096 and U.S. Pat. No. 5,170,283 issued to O'Brien, all of which are incorporated herein by reference.

The source object 14 formed by the microdisplay 12 is magnified by a first stage magnification optic 18 to produce a magnified virtual image. The first stage magnification optic 18 serves to reduce the degree of magnification required of the second stage magnification optic and thus provides a magnification greater than 1. The first stage magnification optic preferably provides a magnification greater than 3, most preferably between about 3 and 10. The first stage magnification optic 18 also preferably has an effective focal length between about 3.5 mm and 37.5 mm.

The magnified virtual image produced by the first stage magnification optic is projected on to a image synthesizing optic 24 to produce a magnified real image 26. The light path between the first stage magnification optic 18 and the image synthesizing optic 24 is referred to as the first distance 22. The first distance 22 is preferably between about 35 and 150 mm. In general, the distance between a magnification optic and the point at which the image is projected equals the focal length (f) of the optic multiplied by the magnification (m) plus 1, i.e., $d=f*(m+1)$. The upper limit of 150 mm corresponds to twice the preferred length of the container within which the synthesized display is contained. It should be noted, however, that larger containers may be employed and thus larger first distances 22 may be used.

Figure 6:
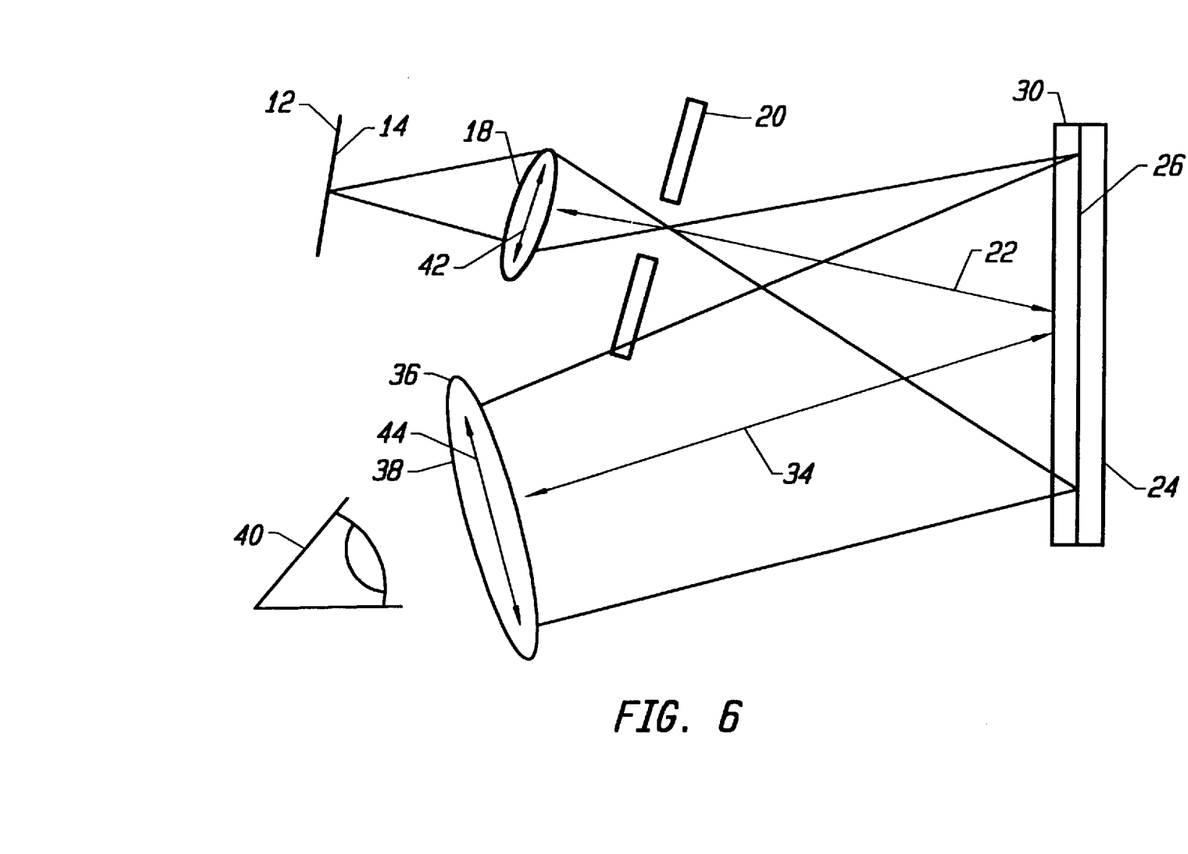
FIG. 6 illustrates a second embodiment of the synthesized display of the present invention in which a reflective image synthesizing optic is employed.

The image synthesizing optic 24 may be any device which produces a directly viewable image when placed in the real image plane of a magnification optic. As illustrated in FIG. 5, the image synthesizing optic may be a light transmissive image synthesizing optic where the source object is imaged on to the rear surface 28 of the image synthesizing optic 24 to produce a magnified real image 26. Alternatively, as illustrated in FIG. 6, the magnified real image 26 may be projected on to a reflective image synthesizing optic 30. The same reference numerals are employed with regard to FIG. 6 as are employed in FIG. 5.

Figure 7:
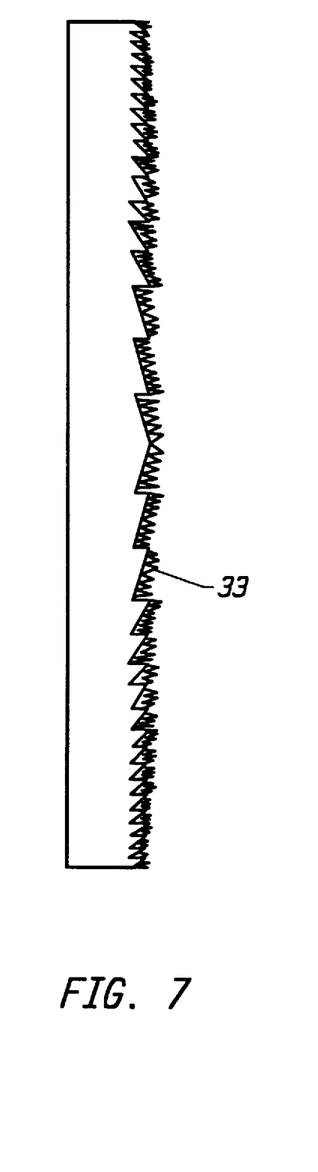
FIG. 7 illustrates a suitable light scattering image synthesizing optic in which a series of micro lenses on the order of 5–10 microns in diameter are used to form small focal length positive and negative lenses.

The image synthesizing optic 24 is preferably designed such that a large fraction of the light is redirected so that the entirety of the image remains visible as the eye is moved laterally relative to the second stage magnification optic. In order to achieve the desired amount of light redirection, the numerical aperture of the directed light is preferably on the order of the (radius of the second stage magnification optic)/(focal length of the second stage magnification optic). In addition, the image synthesizing optic should redirect the central ray of the cone of light from each point on the image synthesizing optic to the center of the second magnification optic. A suitable light redirecting image synthesizing optic is illustrated in FIG. 7 in which a series of micro lenses 33 on the order of 5–10 microns in diameter are used to form small focal length positive or negative lenses. The outputs of the micro lenses may be tilted to direct a large fraction of the light towards the eyepiece. In instances where individual mirror elements are discernible in the virtual image, it is preferred that the image synthesizing optic 24 be designed to alias the magnified real image 26.

Figure 8:
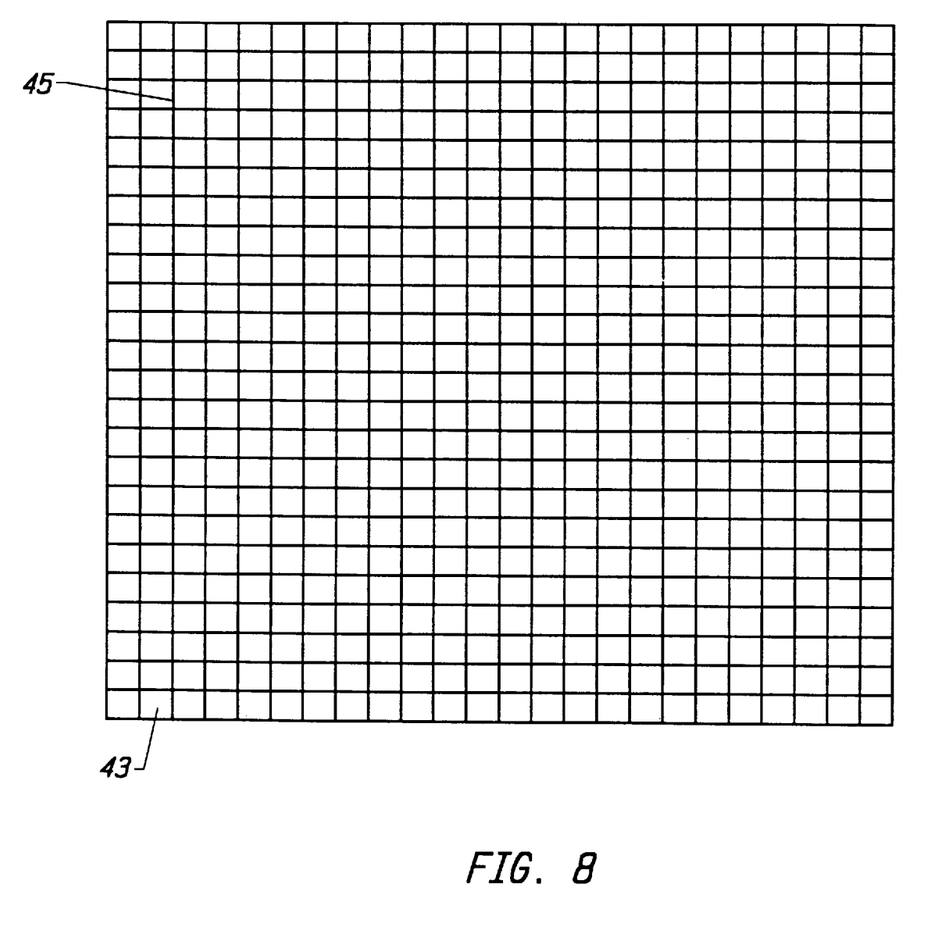
FIG. 8 illustrates a diffusive image synthesizing optic including an opaque barrier separating individual pixels to prevent light from one pixel from being scattered by secondary scatter into a neighboring pixel.

When a light transmissive image synthesizing optic is employed, the image synthesizing optic should be transparent. In addition, the image synthesizing optic can be diffuse such that light is scattered as the light passes throughout the diffusing material. The diffusive scatter performs the function of modifying the numerical aperture of the light. Examples of suitable light diffusing image synthesizing optic materials include ground glass, opal glass, holographic diffusers, thin diffusive plastics such as polystyrene and molded plastic with diffusing surfaces. When a light diffusive material is used, the diffusive material should be thinner than the size of the pixels projected onto the image synthesizing optic to prevent secondary scattering of the light within the diffusive material into neighboring pixels, thereby blurring the pixels. Pixel blurring due to secondary scatter may be overcome using an array of pixels formed of a diffusive material as illustrated in FIG. 8. As illustrated in FIG. 8, the diffusive image synthesizing optic is composed of an array of individual pixels 43 where each pixel is separated by opaque barrier 45 which prevents light from one pixel from being scattered by secondary scatter into a neighboring pixel. The opaque barrier 45 is preferably reflective but may also form a light absorbing barrier.

The magnified real image 26 projected onto the image synthesizing optic 24 is conveyed along a second distance 34 to a second stage magnification optic 36 which magnifies the magnified real image 26 to produce a magnified virtual image 38 which is seen by the user 40. The second distance 34 is approximately equal to the focal length of the second stage magnification optic 36.

The second stage magnification optic 36 is used to provide the user 40 with a magnified virtual image 38. It is preferred that the eye relief provided by the second stage magnification optic 36 be equal to or greater than about 15 mm, more preferably equal to or greater than about 35 mm, most preferably equal to or greater than about 50 mm. The second stage magnification optic preferably provides magnification by a factor of at least about 4, more preferably by a factor between about 4 and 7.

The first and second stage magnification optics 18, 36 combine to magnify the source object formed by the microdisplay by a factor equal to or greater than about 20, more preferably equal to or greater than a factor of about 40. By using two magnification stages, the synthesized display of the present invention is able to employ smaller components and a more compact layout than is possible using one magnification stage corresponding to a projection system, thereby enabling the synthesized display to be positioned within a compact container. More specifically, by magnifying the source object 14 in two stages, the first and second stage magnification optics 18, 38 can have shorter diameters 42, 44 than would be required to magnify the object in a single stage. The distance 22 between the first stage magnification optic 18 and the image synthesizing optic 24 and the distance 34 between the second stage magnification optic 38 and the image synthesizing optic 24 are also shorter than would be required to produce the same degree of magnification in a single stage. In addition, by employing a two stage magnification synthesized display, the degree of magnification needed in the second stage is reduced which, in turn, provides the user with a wider field of view and longer eye relief than compared to high power magnifying lens. The second stage magnification optic can be focused at a point near infinity which reduces the amount of eye strain caused when the user focuses his or her eyes on the synthesized display. These advantages of the compound magnification synthesized display of the present invention are explained in greater detail below by reference to the illustrative examples outlined in Table 1.

When the microdisplay used to form the source object is a spatial light modulator, an illumination source and a light aperture are generally needed to form the source object. An illumination source is needed since the source object formed by a spatial light modulator microdisplay is based on light from the illumination source that is either deflected or non-deflected by the microdisplay. In general, it is preferred that the source object be formed based on non-deflected light which provides a brighter image due to less light loss from reflection off of the array of addressable mirror elements.

The illumination source used to illuminate the microdisplay may be positioned such that illumination is provided off-axis relative to the light path of the image reflected off of the surface of the microdisplay. Off-axis illumination of the microdisplay is preferred in view of the light efficiency provided. Alternatively, illumination from the illumination source may be provided on-axis relative to the light path of the image reflected off of the surface of the microdisplay. When on-axis illumination is employed, a beamsplitter or other mechanism for distinguishing illumination light from light reflected off of the microdisplay is needed. The reflectance of the beamsplitter may be between about 20 and 80%, most preferably 50%. Beamsplitters have the disadvantage of only transmitting a small percentage of the light reflected off of the surface of the microdisplay, generally about 25%. As a result, systems using a beamsplitter generally provide a dimmer image than off-axis systems. It is also preferred that an illumination lens be positioned between the microdisplay and the illumination source to shape the light from the illumination source upon the array of addressable mirror elements on the surface of the microdisplay.

A quarter-waveplate and polarizer may be used as an alternative to a beamsplitter. The polarizer may be any device that preferably reflects one component of the light polarization. The polarizer is preferably a traditional calcite polarizer, a dielectrically coated cube, or a dielectric coated surface. The waveplate may be any device that produces approximately a quarter wave of phase lag between orthogonal polarization components. The waveplate is preferably a quartz quarter-waveplate. In order to achieve the greatest light efficiency, a polarized light source, such as a laser, is preferably used.

Figure 9A:
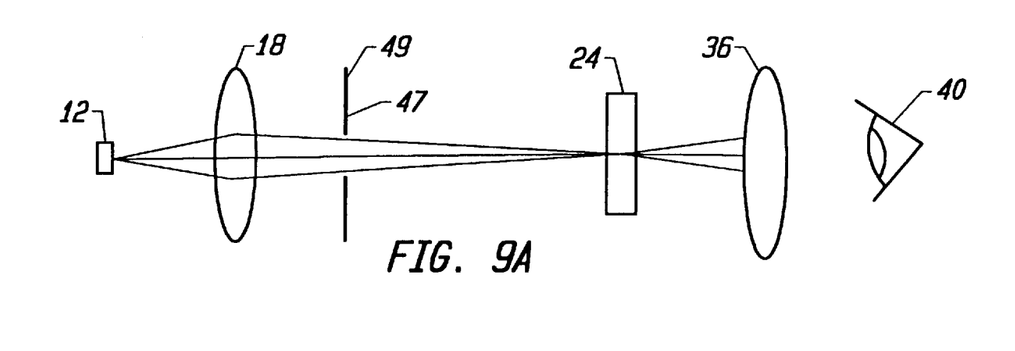
FIG. 9a illustrates an aperture designed to prevent light other than light constituting the image from reaching the image synthesizing optic and FIG. 9b illustrates an aperture as a stop that prevents non-deflected light from passing though the aperture.
Figure 9B:
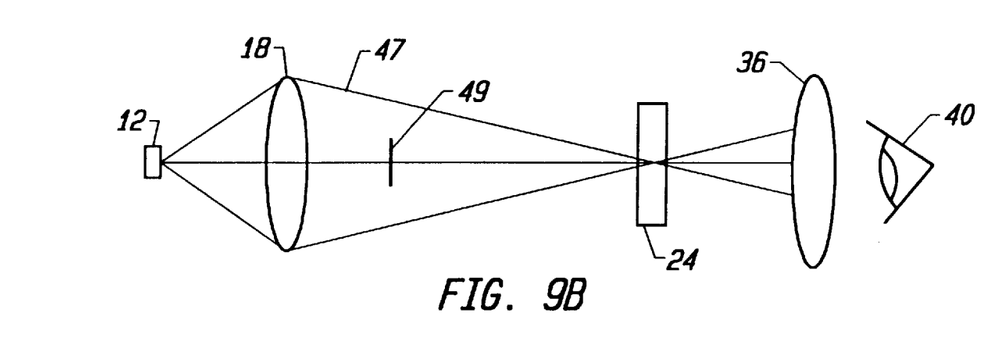

When a spatial light modulator is used to form the source object, an aperture is needed to distinguish between light that has been reflected off a pixel that has been modulated from light reflected off a pixel that has not been modulated. FIG. 9 illustrates two types of light apertures that may be used in the present invention. The aperture 47 illustrated in FIG. 9a is designed to prevent light other than light constituting the image from reaching the image synthesizing optic by preventing the deflected light from passing though the aperture. In an alternative embodiment, illustrated in FIG. 9b, the aperture may be a stop 49 that prevents non-deflected light from passing though the aperture. It should be noted, however, that any light aperture may be adapted for use in the present invention. Examples of other suitable apertures include, but are not limited to, phase plates and spatial filters.

Figure 10A:
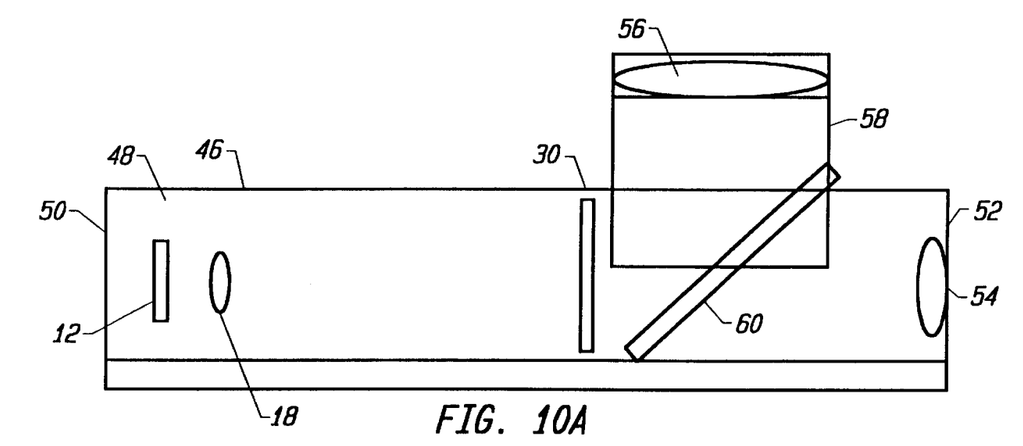

The synthesized display of the present invention is intended as a component which may be incorporated into any electronic device. The incorporation of the synthesized display into an electronic device is illustrated in FIG. 10. FIG. 10a illustrates a cross-sectional view of the device. Reference numerals 46, 48, 50 and 52 refer to the top, side and first and second ends of the device respectively. The synthesized display employed in FIG. 10 has the same general layout as is illustrated in FIG. 5. The same reference numerals are employed with regard to FIG. 10 as are employed in FIG. 5 with the exception of the magnification optics.

As illustrated in FIG. 10, the synthesized display of the electronic device includes two different second stage magnification optics 54, 56 which may be employed by the user as alternative viewing lenses. As illustrated in FIG. 10a, one of the second stage magnification optics 54 is positioned on an end 50 of the device. The second stage magnification optic 56 is positioned on the top 46 of the device. The surface area on the top of the device is larger than the other surfaces of the device. As a result, the top 46 can accommodate a larger sized optic than the other surfaces. By using a larger diameter optic, the user is provided with a wider field of view and greater eye relief.

FIG. 10a illustrates an embodiment of the present invention in which the user is able to select which second stage magnification optic 54, 56 to employ as a viewing lens. In this embodiment, second stage magnification optic 56 is attached to an extendible and retractable viewing assembly 58. When the viewing assembly 58 is extended, a moveable mirror 60 rotates into the path between the image synthesizing optic 30 and second stage magnification optic 54, thereby diverting the image to second stage magnification optic 56.

Figure 10B:
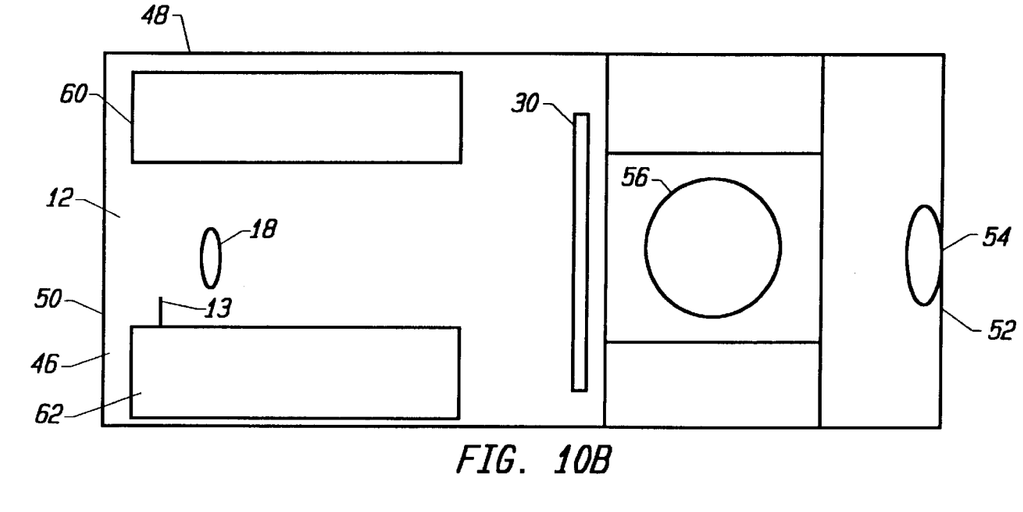

FIG. 10b illustrates the electronics 60, 62 included within the device. Electronic 62 serves as an input device for microdisplay 12 and is electronically attached to the microdisplay 12 by input 13. The input device provides the microdisplay 12 with an electrical signal from which the microdisplay 12 produces an electronically formed source object.

Table 1 provides three examples of synthesized virtual image systems. All examples use the same sized microdisplay and provide the same degree of magnification and eye relief. The second and third examples provide no magnification in the first and second magnification stage respectively. As a result, the second and third examples reflect a single stage magnification system which provides a real image and a virtual image respectively.

reducing the degree of magnification performed in the second stage, the user is provided with significantly greater eye relief than the virtual image display where the magnification is performed in a single step.

In the single stage real image electronic display system, i.e., where the second stage magnification optic 36 provides no magnification, (i.e., $Y^1=1$), the image synthesizing optic 24 is employed to provide an real image to the user 40. In this system, the screen must be a factor of $Y^2$ larger than the image synthesizing optic employed in the two stage magnification system in order to provide the user with an equivalently magnified image. In addition, the first distance 22 must be increased in order for the first stage magnification optic 18 to achieve a factor of $Y^2$ greater magnification.

In an embodiment in which no intermediate image synthesizing optic is used to provide a magnified real image, the electronic display becomes analogous to a compound microscope. In a compound microscope, the user's eye must be in the direct line of site of the source object being magnified. Slight lateral movement of the eye relative to the second stage magnification optic causes the image to no longer be visible.

Figure 11A:
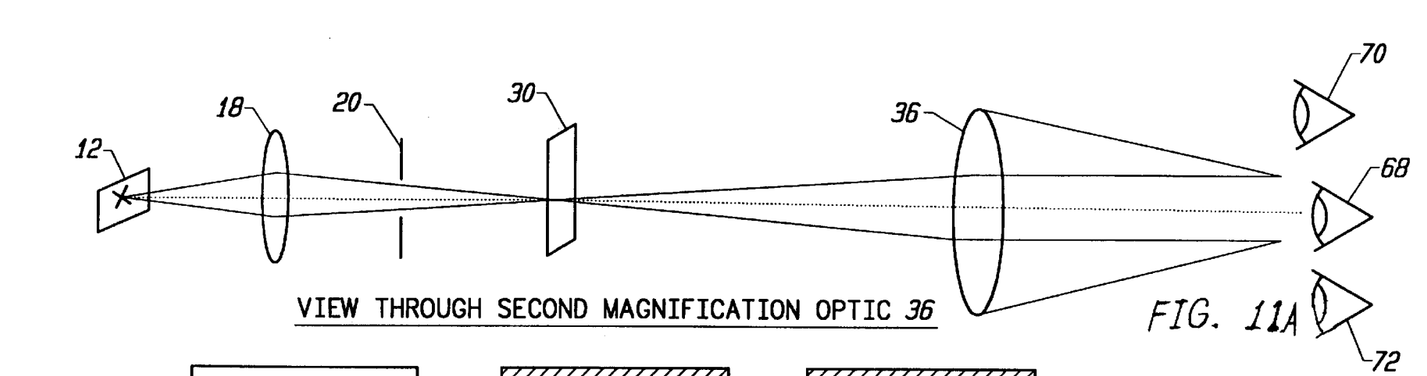
FIG. 11 illustrates the user's field of view with and without an intermediate image synthesizing optic.
Figure 11B:
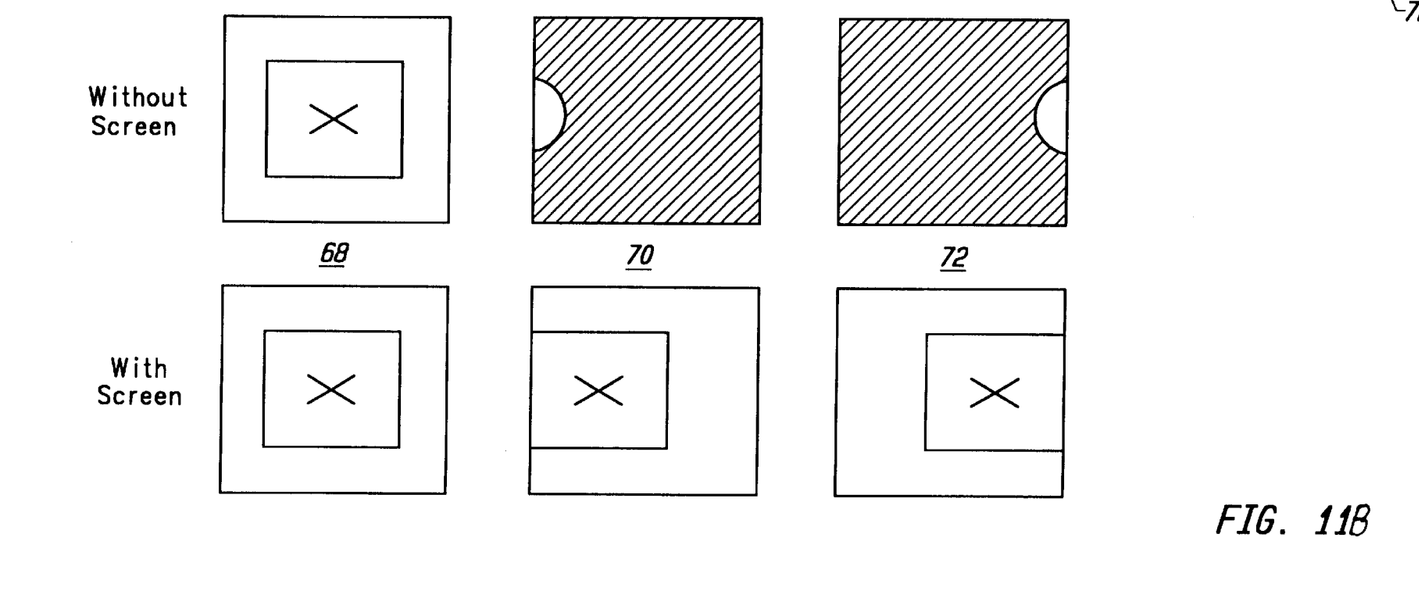

As illustrated in FIG. 11, when an intermediate image synthesizing optic 30 is employed, movement of the user's eye laterally relative to the second stage magnification optic

TABLE 1

| Electronic Display Type | Micro-Display Size (Diagonal) | Overall Magn. $Z = Y_1 * Y_2$ | First Stage Magnification Optic | | Synthesizing Optic Surface Area | Second Stage Magnification Optic | | Distances | | | User Convenience Eye Relief |
|---|---|---|---|---|---|---|---|---|---|---|---|
| | | | Magn. $Y_1$ | Focal Length | | Magn. $Y_2$ | Focal Length | 1st Magn. Optic And Screen | 2nd Magn. Optic And Screen | Total Distance | |
| Synthesized Two Stage | 5 mm | 48x | 8x | 5 mm | 40 × 40 mm | 6x | 41.6 mm | 45 mm | 41.6 mm | 86.6 mm | 80 mm |
| Single Stage, Real Image | 5 mm | 48x | 48x | 5 mm | 240 × 240 mm | 1x | N.A. | 240 mm | N.A. | 240 mm | Infinite |
| Single Stage, Virtual Image | 5 mm | 48x | 1x | N.A. | 5 × 5 mm | 48x | 5 mm | N.A. | 5 mm | 5 mm | 5 mm |

N.A. = Not applicable.

As illustrated in Table 1, the synthesized display according to the present invention provides an overall image magnification of 48 ($Z=Y^1*Y^2$). In the first stage, the object is magnified by the first stage magnification optic 18 by a factor of 8 ($Y^1=8$). In the second stage, the image is magnified by the second stage magnification optic 36 by a factor of 6 ($Y^2=6$). Because the first stage magnification optic 18 only magnifies the source object 14 by a factor of 8 ($Y^1$), the image synthesizing optic 24 need only be a factor of 8 ($Y^1=8$) larger than the first, source object 14 in order to accommodate the magnified real image 26. As shown in Table 1, the image synthesizing optic 24 employed in the present invention may be 6 times ($Y^2=6$) smaller than the image synthesizing optic used in the corresponding single stage real image electronic display without reducing the size of the image as resolved by the user. The 240×240 mm² image synthesizing optic required in the single stage real image electronic display limits the degree to which the display may be miniaturized.

In order to provide a total magnification of 48×, the second stage magnification optic 36 magnifies the magnified real image 26 by a factor of 6 ($Y^2=6$). This is a factor of 8 ($Y^1=8$) less magnification than the second stage magnification optic used in the corresponding single stage display. By from position 68 to either position 70 or position 72 causes the image to move within the field of view in the opposite direction. However, when the image synthesizing optic 30 is removed, also illustrated in FIG. 11, comparable lateral movement of the eye relative to the second stage magnification optic causes the image to vignette and disappear. This can be explained by the longer distance between the second stage magnification optic and the source object being magnified (the microdisplay) when the intermediate image synthesizing optic is removed. By using an intermediate image synthesizing optic, the distance between the second stage magnification optic and the source object being magnified is significantly reduced, thereby providing the user with a wider field of view.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A synthesized virtual image electronic display comprising:
   a microdisplay for forming a source object;
   a first stage magnification optic for magnifying the source object to produce a magnified real image;
   an image synthesizing optic upon which the magnified real image is projected, and
   a second stage magnification optic for providing a magnified virtual image of the magnified real image projected on the image synthesizing optic.

2. A synthesized display according to claim 1 wherein the first and second stage magnification optics provide a combined magnification of at least about 40.

3. A synthesized display according to claim 1 wherein the first stage magnification optic provides a magnification of between about 3 and 10.

4. A synthesized display according to claim 1 wherein the second stage magnification optic provides a magnification of between about 4 and 7.

5. A synthesized display according to claim 1 wherein the synthesized display is positionable within a volume between about 94 and 375 cubic centimeters.

6. A synthesized display according to claim 1 wherein the second stage magnification optic provides an eye relief equal to or greater than 15 mm.

7. A synthesized display according to claim 6 wherein the second stage magnification optic provides an eye relief equal to or greater than 35 mm.

8. A synthesized display according to claim 1 wherein the source object is formed by an array of pixels on the microdisplay wherein each pixel has an area equal to between about 100 and 400 square microns.

9. A synthesized display according to claim 1 wherein the first stage magnification optic has a focal length of between about 3.5 and 37.5 mm.

10. A synthesized display according to claim 1 wherein the image synthesizing optic is light transmissive.

11. A synthesized display according to claim 10 wherein the light transmissive image synthesizing optic includes an array of individual pixels formed of light diffusive material separated from each other by an opaque barrier.

12. A synthesized display according to claim 10 wherein the image synthesizing optic includes a plurality of micro lenses about 5 to 10 microns in diameter.

13. A synthesized display according to claim 1 wherein the image synthesizing optic is reflective.

14. A synthesized display according to claim 13 wherein the reflective image synthesizing optic includes an array of individual pixels formed of light diffusive material separated from each other by an opaque barrier.

15. A synthesized display according to claim 13 wherein the image synthesizing optic includes a plurality of micro lenses about 5 to 10 microns in diameter.

16. A synthesized virtual image electronic display according to claim 1 wherein the microdisplay forms a source object having an area between about 100 $\mu m^2$ and 100 $mm^2$.

17. A synthesized virtual image electronic display according to claim 1 wherein the microdisplay forms a source object having an area between about 25 $mm^2$ and 100 $mm^2$.

18. A synthesized virtual image electronic display according to claim 1 wherein the first and second stage magnification optics provide a combined magnification of at least about 20.

19. A synthesized virtual image electronic display according to claim 1 wherein the second stage magnification optic provides an eye relief of between about 15 and 80 mm.

20. A synthesized virtual image electronic display according to claim 1 wherein the image synthesizing optic is in a focal plane of the second stage magnification optic.

21. A synthesized virtual image electronic display according to claim 1 wherein the image synthesizing optic produces a directly viewable image of the magnified real image.

22. A synthesized virtual image electronic display according to claim 1 wherein the image synthesizing optic is at least partially diffusive to light forming the magnified real image.

23. An electronic device according to claim 22 wherein the microdisplay forms a source object having an area between about 100 $\mu m$ and 100 $mm^2$.

24. An electronic device according to claim 22 wherein the microdisplay forms a source object having an area between about 25 $mm^2$ and 100 $mm^2$.

25. An electronic device according to claim 22 wherein the first and second stage magnification optics provide a combined magnification of at least about 20.

26. An electronic device according to claim 22 wherein the second stage magnification optic provides an eye relief of between about 15 and 80 mm.

27. An electronic device according to claim 22 wherein the image synthesizing optic is in a focal plane of the second stage magnification optic.

28. An electronic device according to claim 22 wherein the image synthesizing optic produces a directly viewable image of the magnified real image.

29. An electronic device according to claim 22 wherein the image synthesizing optic is at least partially diffusive to light forming the magnified real image.

30. An electronic device having a synthesized virtual image electronic display, the device comprising:
   a synthesized virtual image electronic display, the synthesized display including a microdisplay for producing a source object, a first stage magnification optic for magnifying the source object to produce a magnified real image, an image synthesizing optic upon which the magnified real image is projected, and a second stage magnification optic for providing a magnified virtual image of the magnified real image projected on the image synthesizing optic; and
   an electronic input electronically connected to the synthesized virtual image synthesized display for forming the source object.

31. An electronic device according to claim 30 wherein the first and second stage magnification optics provide a combined magnification of at least about 40.

32. An electronic device according to claim 30 wherein the first stage magnification optic provides a magnification of between about 3 and 10.

33. An electronic device according to claim 30 wherein the second stage magnification optic provides a magnification of between about 4 and 7.

34. An electronic device according to claim 30 wherein the synthesized display is positionable within a volume between about 94 and 375 cubic centimeters.

35. An electronic device according to claim 30 wherein the second stage magnification optic provides an eye relief equal to or greater than 15 mm.

36. An electronic device according to claim 35 wherein the second stage magnification optic provides an eye relief equal to or greater than 35 mm.

37. An electronic device according to claim 30 wherein the source object is formed by an array of pixels on the microdisplay wherein each pixel has an area equal to between about 100 and 400 square microns.

38. An electronic device according to claim 30 wherein the first stage magnification optic has a focal length of between about 3.5 and 37.5 mm.

39. An electronic device according to claim 30 wherein the image synthesizing optic is light transmissive.

40. An electronic device according to claim 39 wherein the light transmissive image synthesizing optic includes an array of individual pixels formed of light diffusive material separated from each other by an opaque barrier.

41. An electronic device according to claim 30 wherein the image synthesizing optic includes a plurality of micro lenses about 5 to 10 microns in diameter.

42. An electronic device according to claim 30 wherein the image synthesizing optic is reflective.

43. An electronic device according to claim 42 wherein the reflective image synthesizing optic includes an array of individual pixels formed of light diffusive material separated from each other by an opaque barrier.

44. An electronic device according to claim 43 wherein the image synthesizing optic includes a plurality of micro lenses about 5 to 10 microns in diameter.

* * * * *